(12) United States Patent
Li et al.

(10) Patent No.: US 10,965,998 B2
(45) Date of Patent: Mar. 30, 2021

(54) INFORMATION PUSHING METHOD AND APPARATUS

(71) Applicant: Alibaba Group Holding Limited, Grand Cayman (KY)

(72) Inventors: Yanjun Li, Zhejiang (CN); Yan Gu, Zhejiang (CN); Fei Feng, Zhejiang (CN); Yuzhou Huang, Zhejiang (CN); Jing Tan, Zhejiang (CN)

(*) Notice: Subject to any disclaimer, the term of this patent is extended or adjusted under 35 U.S.C. 154(b) by 0 days.

(21) Appl. No.: 16/517,440

(22) Filed: Jul. 19, 2019

(65) Prior Publication Data

US 2019/0342630 A1    Nov. 7, 2019

Related U.S. Application Data

(63) Continuation of application No. PCT/CN2018/071871, filed on Jan. 9, 2018.

(30) Foreign Application Priority Data

Jan. 20, 2017  (CN) .......................... 201710041904.2

(51) Int. Cl.
*H04N 21/81* (2011.01)
*H04N 21/214* (2011.01)
(Continued)

(52) U.S. Cl.
CPC .......... *H04N 21/812* (2013.01); *G06Q 50/12* (2013.01); *H04L 67/22* (2013.01); *H04L 67/26* (2013.01);
(Continued)

(58) Field of Classification Search
CPC ............. H04N 21/812; H04N 21/2143; H04N 21/2541; H04N 21/4532; H04N 21/6125; G06Q 50/12; H04L 67/22; H04L 67/26
See application file for complete search history.

(56) References Cited

U.S. PATENT DOCUMENTS

| 7,240,364 B1 | 7/2007 | Branscomb et al. |
| 8,489,742 B2 | 7/2013 | Clubb et al. |

(Continued)

FOREIGN PATENT DOCUMENTS

| CN | 102118401 A | 7/2011 |
| CN | 104735475 A | 6/2015 |
| CN | 105046600 A | 11/2015 |

OTHER PUBLICATIONS

Translation of ISR for corresponding PCT Application PCT/CN2018/071871, dated Jul. 26, 2018, a counterpart foreign application for U.S. Appl. No. 16/517,440, 2 pages.

(Continued)

*Primary Examiner* — Randy A Flynn
(74) *Attorney, Agent, or Firm* — Lee & Hayes, P.C.

(57) ABSTRACT

A method and an apparatus for pushing information are provided. The method stores mapping relationships between device identifiers of different network devices and server identifiers of push servers that push service information to the network devices in a gateway platform, and further stores respective preference features corresponding to user identifiers in the gateway platform. When a user checks in a hotel room, the gateway platform determines a corresponding push server according to a device identifier of a network device in the hotel room where the user checks in, and sends the user's preference feature to the determined push server. Therefore, after the user stays in the hotel room, information displayed by an Internet television is information preferred by the user, and the user does not have to spend effort to search for the information that is preferred by the user, thereby improving the convenience of using the Internet television.

20 Claims, 7 Drawing Sheets

(51) Int. Cl.
- *H04N 21/254* (2011.01)
- *H04N 21/45* (2011.01)
- *H04N 21/61* (2011.01)
- *G06Q 50/12* (2012.01)
- *H04L 29/08* (2006.01)

(52) U.S. Cl.
CPC ..... *H04N 21/2143* (2013.01); *H04N 21/2541* (2013.01); *H04N 21/4532* (2013.01); *H04N 21/6125* (2013.01)

(56) References Cited

U.S. PATENT DOCUMENTS

| | | | |
|---|---|---|---|
| 9,078,128 B2 | 7/2015 | Medina et al. | |
| 9,256,761 B1 | 2/2016 | Sahu et al. | |
| 9,307,039 B2 | 4/2016 | Peng et al. | |
| 9,667,713 B2 | 5/2017 | Vyrros et al. | |
| 10,419,463 B2 | 9/2019 | Muddu et al. | |
| 2004/0034537 A1* | 2/2004 | Gengarella | G06Q 30/02 705/5 |
| 2005/0144642 A1* | 6/2005 | Ratterman | H04N 21/47202 725/78 |
| 2011/0314502 A1* | 12/2011 | Levy | H04N 21/4532 725/46 |
| 2012/0102409 A1 | 4/2012 | Fan et al. | |
| 2013/0144954 A1* | 6/2013 | Li | H04L 67/26 709/205 |
| 2013/0305320 A1* | 11/2013 | Warrick | G06F 21/31 726/4 |
| 2013/0346521 A1* | 12/2013 | Arabo | H04L 29/08693 709/206 |
| 2014/0006129 A1 | 1/2014 | Heath | |
| 2014/0171039 A1* | 6/2014 | Bjontegard | H04L 67/22 455/414.1 |
| 2014/0316826 A1 | 10/2014 | Nicoara et al. | |
| 2015/0254726 A1* | 9/2015 | Cassidy | G06Q 30/0261 705/14.58 |
| 2015/0324332 A1* | 11/2015 | Perret | H04L 67/1095 715/234 |
| 2016/0277909 A1* | 9/2016 | Salvador | H04L 67/26 |

OTHER PUBLICATIONS

Translation of Written Opinion for corresponding PCT Application PCT/CN2018/071871, dated Jul. 26, 2018, a counterpart foreign application for U.S. Appl. No. 16/517,440 , 5 pages.

* cited by examiner

INFORMATION PUSHING METHOD AND APPARATUS

CROSS REFERENCE TO RELATED PATENT APPLICATIONS

This application claims priority to and is a continuation of PCT Patent Application No. PCT/CN2018/071871 filed on 9 Jan. 2018, and is related to and claims priority to Chinese Patent Application No. 201710041904.2, filed on 20 Jan. 2017 and entitled "Information Pushing Method and Apparatus," which are hereby incorporated by reference in their entirety.

TECHNICAL FIELD

The present application relates to the technical field of networking, and particularly to information pushing methods and apparatuses.

BACKGROUND

The Internet television technology refers to an information display technology implemented on a terminal based on a broadband network, with information on the network (pictures, audio, video, games, etc.) as the main body, and a television or a display, etc. as the terminal. The terminal is connected to the broadband network by connecting to a network device (such as a network set-top box). A terminal that can connect to a network device and display information is an Internet television.

Service providers in the market provide network devices developed thereby, and information displayed by an Internet television connected to a certain network device is generally also pushed by a service provider corresponding to the network device. Specifically, a push server of the service provider pushes information to the network device, and the network device then displays the received information on the Internet television, to allow a user of the Internet television to make a selection.

In existing technologies, a push server may send pertinent information preferred by a user to a corresponding network device according to preference features set by the user, so that information displayed on an Internet television matches the preferences of the user. For example, if a user A connects to a network device provided by a service provider B for his/her own Internet television, and sets his/her own preference features on the network device (like watching martial arts drama, and do not like to watch romance drama), B's push server will then according to characteristics of A's preferences, pushing more martial arts dramas to the network device, and pushing fewer or no romance dramas.

However, when a user stays in a hotel due to a business trip or a travel, the hotel (the passenger) is more mobile, and the hotel cannot pre-set preference features applicable to each user due to relatively high mobility of users of the hotel (travelers). As a result, information displayed on an Internet television in a hotel room of a hotel nowadays is often randomly selected by a corresponding push server, rather than being selected for a preference of a user currently staying in the hotel room.

With the popularity of Internet televisions, an increasing number of users have become accustomed to directly accessing their favorite information from their home Internet televisions. When staying in a hotel room, a user has to spend effort on searching information displayed on an Internet television for information of his/her own preference, which reduces the convenience of using the Internet television by the user who stays in the hotel room.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present application aim to provide a method and an apparatus for pushing information to improve the convenience of using an Internet television by a user who stays in a hotel room.

To solve the above technical problems, the embodiments of the present application are implemented as follows.

An information pushing method provided by the embodiments of the present application is applied to a gateway platform. The method includes:

receiving an information push notification sent by a hotel management system, the information push notification being sent by the hotel management system after performing a check-in for a user, and the information push notification including a device identifier of a network device and a user identifier of the user;

determining a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and sending preference feature(s) corresponding to the user identifier to the determined push server, to cause the push server to push service information corresponding to the preference feature(s) to the network device corresponding to the device identifier.

An information pushing method provided by the embodiments of the present application is applied to a gateway platform. The method includes:

receiving an information push notification sent by a hotel management system, the information push notification being sent by the hotel management system after performing a check-in for a user, and the information push notification including a hotel identifier of a hotel, a device identifier of a network device, and a user identifier of the user;

determining promotion information corresponding to preference feature(s) in a promotion information list according to the preference feature(s) corresponding to the user identifier;

determining a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and sending the determined promotion information and the device identifier to the determined push server, to cause the push server to push the promotion information to the network device corresponding to the device identifier.

An information pushing apparatus provided by the embodiments of the present application includes:

- a receiving module that receives receiving an information push notification sent by a hotel management system, the information push notification being sent by the hotel management system after performing a check-in for a user, and the information push notification including a device identifier of a network device and a user identifier of the user;
- a determination module that determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and
- a sending module that sends preference feature(s) corresponding to the user identifier to the determined push server, to cause the push server to push service information corresponding to the preference feature(s) to the network device corresponding to the device identifier.

An information pushing apparatus provided by the embodiments of the present application includes:

- a receiving module that receives an information push notification sent by a hotel management system, the information push notification being sent by the hotel management system after performing a check-in for a user, and the information push notification including a hotel identifier of a hotel, a device identifier of a network device, and a user identifier of the user;
- a determination module that determines promotion information corresponding to the preference feature(s) in a promotion information list according to preference feature(s) corresponding to the user identifier, and determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and
- a sending module that sends the determined promotion information and the device identifier to the determined push server, to cause the push server to push the promotion information to the network device corresponding to the device identifier.

As shown in the technical solutions provided by the embodiments of the present application, by storing respective mapping relationships between device identifiers of different network device and server identifiers of push servers that push service information to the network devices in a gateway platform on the one hand, and storing preference feature(s) corresponding to the user identifier in the gateway platform on the other hand, the embodiments of the present application enable the gateway platform to determine a corresponding push server according to a device identifier of a network device in a hotel room where a user stays when the user checks in the hotel room, and send preference feature(s) of the user to the determined push server. As such, after the user checks in the hotel room, information displayed by an Internet television is information preferred by the user, and the user does not have to spend effort to searching for the information that is preferred by the user, thereby improving the convenience of using the Internet television in the hotel room by the user.

BRIEF DESCRIPTION OF THE DRAWINGS

In order to illustrate the technical solutions of the embodiments of the present application more clearly, accompanying drawings needed for describing the embodiments are briefly described herein. Apparently, the drawings in the following description merely represent some embodiments recorded in the present application. Based on these drawings, one of ordinary skill in the art can obtain other drawings without making any inventive effort.

DETAILED DESCRIPTION

Figure 1:
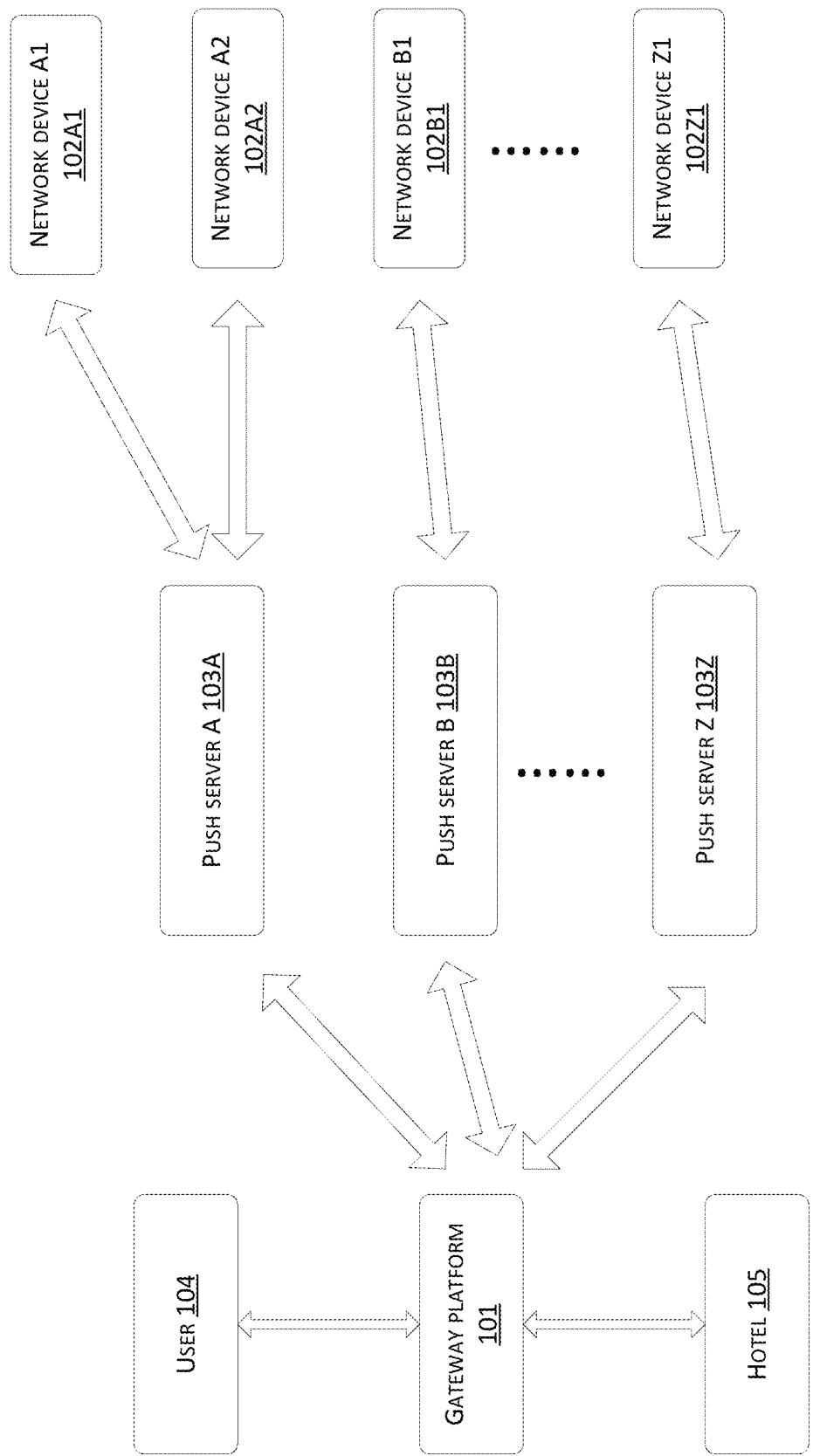
FIG. 1 is a schematic functional diagram of a gateway platform provided by the embodiments of the present application.

The embodiments of the present application provide a method and an apparatus for pushing information.

In order to enable one skilled in the art to understand the technical solutions in the embodiments of the present application in a better manner, the technical solutions in the embodiments of the present application are described hereinafter in a clear and comprehensive manner in conjunction with the accompanying drawings in the embodiments of the present application. Apparently, the described embodiments merely represent some and not all of the embodiments of the present application. All other embodiments obtained by one of ordinary skill in the art based on these embodiments of the present application without making any inventive effort shall fall within the scope of protection of the application.

With the popularity of Internet televisions, an increasing number of hotels have started to install Internet televisions and network devices in their rooms. Different service providers that provide network devices and push information through the network devices exist in the market. The network devices provided by the service providers are generally network set-top boxes, and may also be other smart devices that can connect the Internet televisions to the Internet. A push server of a service provider can push information to a corresponding network device, and the network device then transmits the information to an Internet television for display.

A hotel usually chooses a certain service provider, and configures network devices provided by the service provider for each room. When a user checks in a hotel room, and turns on an Internet television, information displayed by the Internet television is pushed by the push server of the service provider by default. The information may be pictures, audio, video, games, services, product advertisements, etc., on a network. A user of an Internet television can not only obtain various pictures on the Internet, listen to music, and watch movies through the Internet television, but can also experience or consume games or services pushed by the service provider using a controller adapted to the Internet television, a mobile phone of the user, a controller of the user, etc., thus interacting with the Internet television. In order to adapt the mobile phone and the controller thereof to the Internet television in the hotel room, the user can install a control program of the Internet television in the hotel room for his/her mobile phone, or install a driver of his/her mobile phone or controller onto the Internet television.

The user can select a product displayed on the Internet television, place an order, and make a payment to complete a purchase. The user can also play a copyright-restricted movie or music by making a payment through the Internet television. The user can also choose a food and place an order from among foods provided by various takeaway restaurants that are pushed on the Internet television. In short, any information that exists on a network and can be displayed by an Internet television can be the information.

For example, information displayed by an Internet television may be a product purchase link that is pushed by a corresponding push server. A user may select the product purchase link to complete an order through a controller of the Internet television. For example, information displayed by an Internet television may be a takeaway service nearby a hotel where a user stays. The user selects one of the takeaway merchants displayed on the Internet television, enters an online store of this takeaway merchant, selects a specific food, places an order, and makes a payment. For example, information displayed by an Internet television can be a racing game. After a user selects to enter the racing game, the user can control the speed and the direction of a car displayed on the Internet television through a controller of the Internet television or his/her own mobile phone.

As described in the background, different from information pushing services of a home Internet television (i.e., a push server pushes corresponding information according to preference feature(s) configured by a user who stably uses the Internet television), information pushed to an Internet television in a hotel room by a push server is often randomly selected or selected according to requests of an associated hotel. This is because the mobility of users who stay in the hotel room is very high, and a push server of a service provider cannot select a corresponding information push according to specific preference features. As can be seen, existing information pushing methods based on Internet television cannot implement a general personalized information push in a hotel setting, such as a home setting.

Accordingly, in the technical solutions provided by the embodiments of the present application, a gateway platform may be set up. The gateway platform may be a server, a server group, a cloud server, etc., that has a storage function and a data analysis processing function. FIG. 1 is a schematic functional diagram of a gateway platform 101 provided by the embodiments of the present application. As shown in FIG. 1, the number of network devices 102 (such as network devices 102A1, 102A2, 10261, - - - 102Z1, which are collectively called as network devices 102) corresponding to a push server 103 (e.g., a push server A 103A among push servers 103A, 103B, . . . , 103Z, which are collectively called as push servers 103) may be more than one. Each network device 102 may send information selected by a user 104 on an Internet television to a corresponding push server. The push server then forwards the information to the gateway platform 101, for storage by the gateway platform 101 as historical user activity data.

Specifically, functions of the gateway platform can have the following aspects:

1. The gateway platform 101 may invite a user to register a user identifier on the gateway platform 101, or may allow the user 104 to log into the gateway platform 101 using the user identifier (such as an IP address, an account of a general website, etc.) that has been registered on the Internet. Preference feature(s) corresponding to each user identifier may be stored in the gateway platform 101, and the preference feature(s) may be configured by a respective user 104 corresponding to each user identifier (e.g., the user may set his/her own preference feature(s) immediately after completing registration on the gateway platform 101), or may be obtained by the gateway platform 101 (e.g., the user 104 logs into the gateway platform 101 using an account of an e-commerce platform that is already registered on the Internet, and the gateway platform 101 may obtain preference feature(s) set by the user 104 stored on the e-commerce platform with a privilege from the e-commerce platform).

Furthermore, historical user activity data corresponding to each user identifier may also be stored in the gateway platform 101. The historical user activity data may be information selected on the Internet television through the user identifier in the past, or may be big data generated on the Internet through the user identifier.

For example, after a user identifier of a user 104 is created, the gateway platform 101 monitors and detects that the user 104 has booked and stayed in three hotels 105 through the gateway platform 101 within a subsequent period of time, watched a movie "Hero" on an Internet television in a first hotel room, played a game "Super Mario" on an Internet television in a second hotel room, and selected a service "In-home Message" on an Internet television in a third hotel room. As such, the movie "Hero", the game "Super Mario", and the service "In-home Massage correspond to historical information selected on Internet televisions through the user identifier, and can be used as historical user activity data corresponding to the user identifier.

In the above example, the gateway platform 101 can monitor and detect the information selected by the user 104 because the gateway platform 101 cooperates with the three hotels 105 where the user 104 has stayed and service providers that provide information pushing services for the three hotels 104. This involves other functions of the gateway platform 101, which will be explained later.

For another example, a user 104 logs into the gateway platform 101 using an account that has already been registered on a certain e-commerce platform. Since the gateway platform 101 has a cooperative relationship with this e-commerce platform and supports an account universal, the gateway platform 101 also stores the account, and further a shopping record of the user 104 from the e-commerce platform, i.e., big data of the user 104 on the e-commerce platform, as historical user activity data corresponding to a user identifier of the user 104.

In summary, the first function of the gateway platform 101 is to store user identifiers of users who use services of the gateway platform 101 and respective preference features corresponding to the user identifiers, to ensure that corresponding preference feature(s) of any user identifier can be determined when such user identifier is received.

2. The gateway platform 101 can cooperate with various service providers to register respective push servers 103 of the service providers on the gateway platform 101. Specifically, the gateway platform 101 may receive and store server identifier(s) of push server(s) 103 of each service provider and a device identifier of each network device in advance. For each server identifier, device identifier(s) of network device(s) 102 provided by a service provider corresponding to the respective server identifier is/are determined, and a correspondence relationship between the respective server identifier and the determined device identifier(s) is stored. Respective server identifiers, device identifiers, and respective device identifier(s) corresponding to each server identifier provided by various server providers can also be received and stored in advance.

In this way, the gateway platform 101 can connect each network device 102 in a hotel 105 with a push server 103 corresponding to the respective network device 102 to ensure that preference feature(s) corresponding to a user 104 who stays in a certain room is smoothly sent to the push server 103 corresponding to the respective network device 102 of the room.

For example, a device identifier of a network device 102 in a hotel room where a user 3526 (a user identifier is 3526) who prefers idol dramas checks in is PX996, and a server identifier of a push server 103 of a service provider providing the network device is F2. In this case, after the user 3526 checks in the hotel room, and turns on an Internet television, most of what are displayed by the Internet television by default are idol dramas. These idol dramas are selected and pushed to the network device PX996 by the push server F2 according to the preference feature(s) of the user 3526 that is/are sent by the gateway platform 101.

3. The gateway platform 101 will also cooperate with various hotels 105 to provide each hotel with a client that is compatible with a hotel management system of the respective hotel 105. When a user 104 arrives at a hotel 105 to check in, and after the hotel 105 confirms a room where the user 104 will stay through a hotel management system, a client can be used to synchronize a user identifier and check-in information of the user 104 (mainly a room number of the room where the user 104 stays and a device identifier of a network device 102 in the room) with the gateway platform 101. The gateway platform 101 knows the user identifier of the user 104 who currently stays in the room of the room number, and therefore identifies that the user identifier and the device identifier are currently associated with each other, in order to instruct a push server corresponding to the device identifier to push service information that matches with preference feature(s) corresponding to the user identifier to the network device 102 corresponding to the device identifier.

The client may be a plug-in installed on a hotel management system, or may be software installed on a server of a hotel, or may be a hardware device used by the hotel. In short, the client needs to have such functionalities as: on the one hand, being capable of smoothly connecting with the hotel management system of the hotel, and receiving a user identifier of a user, a device identifier of a network device in a confirmed room where the user stays, and other electronic data (such as an electronic certificate) that are sent by the hotel management system when the user goes to the hotel for check-in; and on the other hand, being capable of interacting with the gateway platform, i.e., being able to send an information push notification to the gateway platform, and also being able to receive electronic data such as a verification notification sent by the gateway platform. For the sake of description, the hotel management system described hereinafter apparently has the functionalities of the client, and can interact with the gateway platform.

A function of the verification notification includes the following. If a user books a hotel room through the gateway platform, a hotel can request the user to present an electronic certificate (a verification code, a two-dimensional code, a password, etc.) that is obtained after a hotel reservation is made on the gateway platform, when the user comes to a hotel to request a check-in. The hotel sends the electronic certificate presented by the user to the gateway platform through a hotel management system for verification. If the verification is passed, the gateway platform returns a verification notification to the hotel management system, and the hotel can perform the check-in for the user. At the same time, the electronic certification also includes a user identifier of the user, and the hotel management system can directly obtain the user identifier of the user, and send a device identifier of a network device in a hotel room that has been determined together with the user identifier to the gateway platform.

In addition, if a user does not book a hotel room through the gateway platform, but directly goes to a hotel, and requests a check-in as an individual traveler, the hotel can ask the user whether he/she has a user identifier on the gateway platform. If the user is willing to provide the user identifier, a hotel management system can send the user identifier together with a corresponding device identifier to the gateway platform, and thus personalized information pushing services can be implemented for the user.

It is worth noting that a user can install a user-version client (software) provided by the gateway platform on a smart device such as a mobile phone, a computer, etc. The user can interact with the gateway platform through the user-version client, and can also instruct to push server to push information to a network device in a hotel room where he/she stays. The user can also make a hotel reservation. The user-version client and the client are both provided by the gateway platform, and are both configured to enable a user or a hotel to interact with the gateway platform. A difference between functions of these two is that the user-version client can provide a user with various services such as making a hotel reservation, taking a taxi, querying a map, controlling devices in a hotel room (an Internet television, a door lock, an air conditioner, etc.), etc, during a travel, whereas the client is mainly used for synchronizing check-in information of a user with the gateway platform by a hotel.

Based on the three functions of the gateway platform as described above, the technical solutions of the embodiments of the present application can solve the problem of inconvenience of using the Internet television by a user who stays in a hotel room.

The technical solutions provided by the embodiments of the present application are described in detail below with reference to the accompanying drawings.

Figure 2:
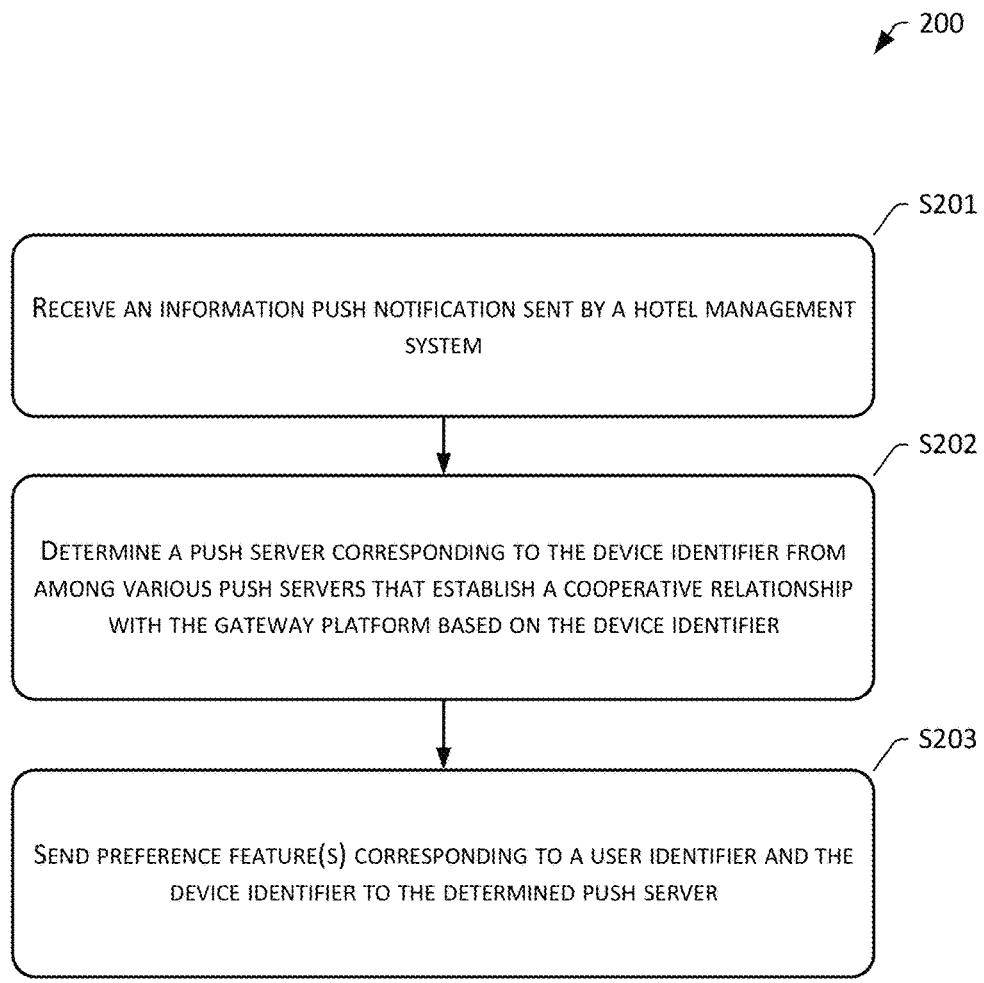
FIG. 2 is a flowchart of an information pushing method provided by the embodiments of the present application.

FIG. 2 is a flowchart of a method 200 for pushing information provided by the embodiments of the present application, which includes the following operations.

S201: Receive an information push notification sent by a hotel management system.

In the embodiments of the present application, an execution body of the method is a gateway platform. The hotel management system may send an information push notification carrying a device identifier of a network device and a user identifier of a user to the gateway platform after the user checks in.

For example, a user A can make a hotel reservation through a user-version client provided by the gateway platform, and the user subsequently goes to a predetermined hotel for check-in. The hotel enters a check-in instruction (R205-T205, A) in a hotel management system, wherein R205 is a room number, T205 is a device identifier of a network device in an associated room, and A is a user identifier of the user A. The hotel management system receives the check-in instruction for the user A, generates an information push notification carrying the device identifier T205 and the user identifier of A, and sends the information push notification to the gateway platform.

S202: Determine a push server corresponding to the device identifier from among various push servers that establish a cooperative relationship with the gateway platform based on the device identifier.

In the embodiments of the present application, mapping relationships between device identifiers of different network devices and server identifiers of push servers that push service information to the network devices are determined by:

receiving and storing a server identifier of a push server of each network device service provider that establishes a cooperative relationship with the gateway platform and a device identifier of each network device; and determining a device identifier of a network device provided by a network device service provider corresponding to a server identifier for each server identifier, and establishing a mapping relationship between the server identifier and the determined device identifier of the network device.

Also, a device identifier of a network device and a server identifier of a push server that pushes service information to the network device can be directly received and stored.

S203: Send preference feature(s) corresponding to a user identifier and the device identifier to the determined push server.

In the embodiments of the present application, the preference feature(s) and the device identifier may be encapsulated according to a defined gateway control protocol, and the encapsulated preference feature(s) and device identifier are sent to the determined push server, so that the determined push server parses the preference feature(s) and the device identifier from the encapsulated preference feature(s) and device identifier, and pushes the service information corresponding to the preference feature(s) to the network device corresponding to the device identifier.

In the embodiments of the present application, after operation S203, the push server can push service information corresponding to the preference feature(s) to the network device corresponding to the device identifier.

In the embodiments of the present application, a method of determining the preference feature(s) corresponding to the user identifier may be: searching a user activity database for historical user activity data corresponding to the user identifier based on the user identifier, the user activity database including mapping relationships between user identifiers and respective historical user activity data; and determining the preference feature(s) corresponding to the user identifier based on the historical user activity data corresponding to the user identifier. The user activity database may be obtained using the following approach: collecting device execution data and/or user service data sent by respective user identifiers for different user identifiers, using the collected device execution data and/or user service data as respective historical user activity data, and storing the respective user identifiers and the respective historical user activity data into the user activity database.

The preference feature(s) corresponding to the user identifier may also be determined from pre-stored preference features based on the user identifier, and the preference feature(s) and the device identifier are sent to the push server corresponding to the device identifier.

For example, a user may select a preference feature in a preference feature setting interface provided by a user-version client. The gateway platform receives and stores the preference feature that is selected by the user and sent by the user-version client, and establishes a correspondence relationship between the received preference feature and a user identifier of the user.

For another example, if a user logs into the gateway platform using a user identifier that has been registered on the Internet, the gateway platform can use big data generated using the user identifier on the Internet as historical user activity data, and then analyze the historical user activity data corresponding to the user identifier to determine preference feature(s) corresponding to the user identifier, or may directly obtain preference feature(s) that is/are set using the user identifier on the Internet.

In addition, the historical user activity data is at least one of a picture type, a video type, an audio type, a product type, and a service type that the user prefers.

In addition, after the user enters the hotel room, the user-version client installed on the smart device can be used to send a service request to the gateway platform. When the gateway platform has received the information pushing request sent by the hotel management system, the service request may only carry information feature(s) (such as martial arts movies, motion sensing games) inputted by the user to the user-version client. If the user does not provide his/her user identifier, and the gateway platform is still not sure about the device identifier of the network device in the hotel room where the user stays, the service request may carry the user identifier of the user, the information feature(s) inputted by the user, and the corresponding device identifier. In short, the technical solutions provided by the present application also support the user to request the gateway platform for pushing information of his/her own preference.

In the embodiments of the present application, the user can select the information displayed by the Internet television through an auxiliary controller of the Internet television or his/her mobile phone in the hotel room, and interact with the Internet television, such as playing a game.

In addition, when the user rests in the lobby of the hotel, a commercial display of the lobby of the hotel can be activated using the user-version client installed on the mobile phone, and the commercial display displays information that is preferred by the user. Specific principles are similar to the situation in which the user enters the hotel room and requests the gateway platform for pushing information, and are not repeatedly described herein.

Using the information pushing method as shown in FIG. 2, mapping relationship between device identifiers of different network devices and server identifiers of respective push servers that push service information to the network devices is stored on a gateway platform on the one hand, and respective preference features corresponding to the user identifiers are stored in the gateway platform on the other hand. As such, when a user checks in a hotel room, the gateway platform determines a corresponding push server according to a device identifier of a network device in the hotel room where the user is staying, and sends preference feature(s) of the user to the determined push server. In this way, after the user checks in the hotel room, information displayed by an Internet television is information preferred by the user, and the user does not have to spend effort to search for the information that is preferred by the user, thereby improving the convenience using the Internet television in the hotel room by the user.

Figure 3:
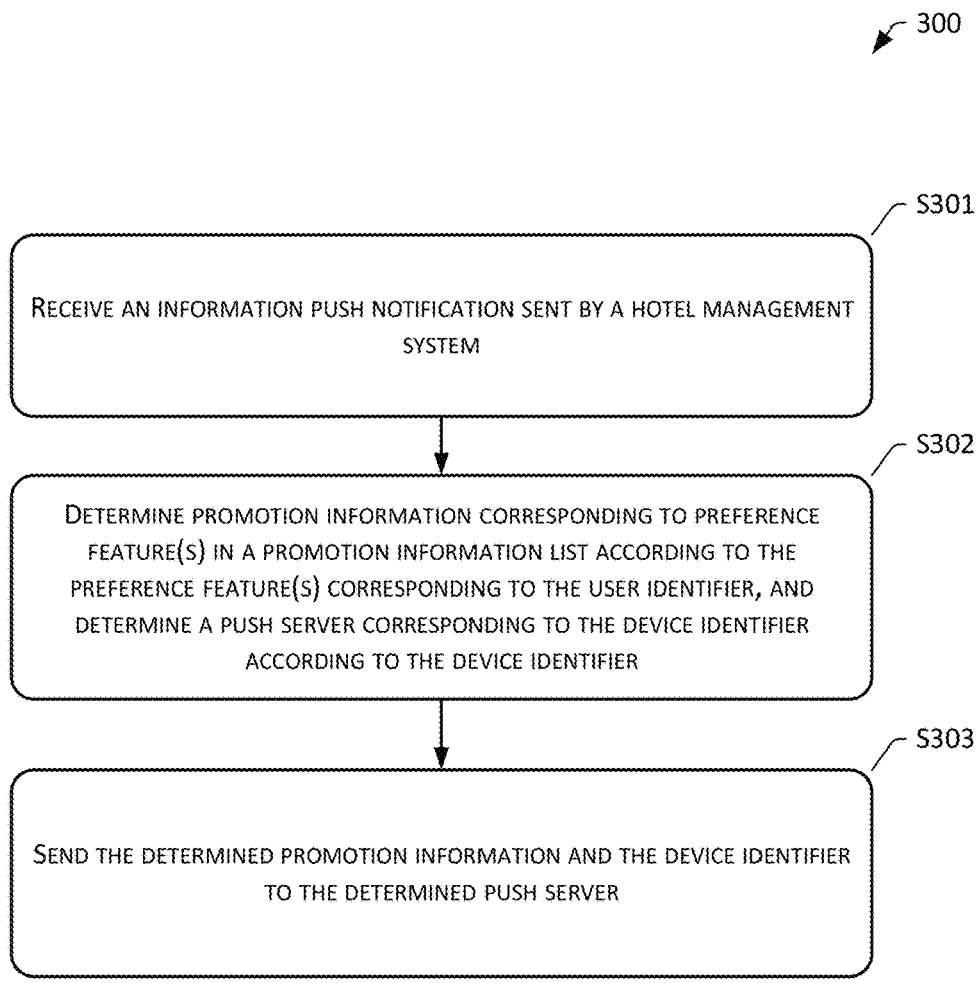
FIG. 3 is a flowchart of an information pushing method provided by the embodiments of the present application.

FIG. 3 is a flowchart of a method 300 for pushing information according to the embodiments of the present application, which includes the following operations.

S301: Receive an information push notification sent by a hotel management system.

S302: Determine promotion information corresponding to preference feature(s) in a promotion information list according to the preference feature(s) corresponding to the user identifier, and determine a push server corresponding to the device identifier from among a plurality of push servers that establish a cooperative relationship with the gateway platform according to the device identifier.

S303: Send the determined promotion information and the device identifier to the determined push server.

The method shown in FIG. 3 and the method shown in FIG. 2 are based on the same inventive concept. The method shown in FIG. 2 has been described, and the method shown in FIG. 3 is not redundantly described herein.

In the embodiments of the present application, the gateway platform can not only send preference feature(s) of a user to a push server to cause the push server to push service information preferred by the user to a network device viewed by the user, but can also maintain a promotion information list. Promotion information (product information and/or merchant information) recorded in the promotion information list may be specified by the gateway platform, specified by a hotel, or randomly specified. After the user enters a hotel room, the gateway platform not only sends the preference feature(s) of the user to the push server, but also filters and selects promotion information preferred by the user from among the promotion information list according to the preference feature(s) of the user. The gateway platform then sends the promotion information to the push server, to allow the push server to push the promotion information with the service information to the network device viewed by the user.

Specifically, the gateway platform may determine a product category and/or a merchant category that is preferred by the user based on the preference feature(s) corresponding to the user identifier, and determine promotion information corresponding to the product category and/or the merchant category (which is used as the promotion information corresponding to the preference feature(s)) from the promotion information list according to the determined product category and/or the merchant category.

For example, the hotel can upload product information of some products that are sold in the hotel to the gateway platform in advance through the hotel management system, and treat these pieces of product information as the promotion information in the promotion information list. Merchants near the hotel can also provide their own merchant information to the gateway platform, and add these pieces of merchant information to the promotion information list.

In addition, the gateway platform can also select merchants near the hotel according to a hotel address of the hotel, and use merchant information of these merchants as the promotion information. The hotel address may be sent to the gateway platform by the hotel management system, or may be obtained by the gateway platform according to a hotel identifier of the hotel through a means such as a network map, a satellite GPS positioning, and the like.

The gateway platform can provide a merchant-version client for the merchants near the hotel, and the merchant publishes the merchant information on the gateway platform through the merchant-version client, and then push different merchant information to the user through the information pushing solutions provided by the present application.

Furthermore, the gateway platform may also provide push solutions to different merchants through the merchant-version client. In the embodiments of the present application, for different pushing solutions, a pushing price provided by the gateway platform may be fixed. After selecting a pushing solution through the client, a merchant pays a corresponding price to the gateway platform. Alternatively, a pushing price can be flexible, i.e., a bidding method is adopted. Different merchants can bid for a pushing mode provided by the gateway platform, and a merchant with a high bid can obtain a pushing solution, and the push solution is implemented to push associated merchant information on the gateway platform.

In addition, in this mode, the merchant can complete a payment using different payment channels, for example, completing the payment through a telecommunication channel; completing the payment by means of an advertisement fee; etc. No specific limitation is made herein.

Figure 4A:
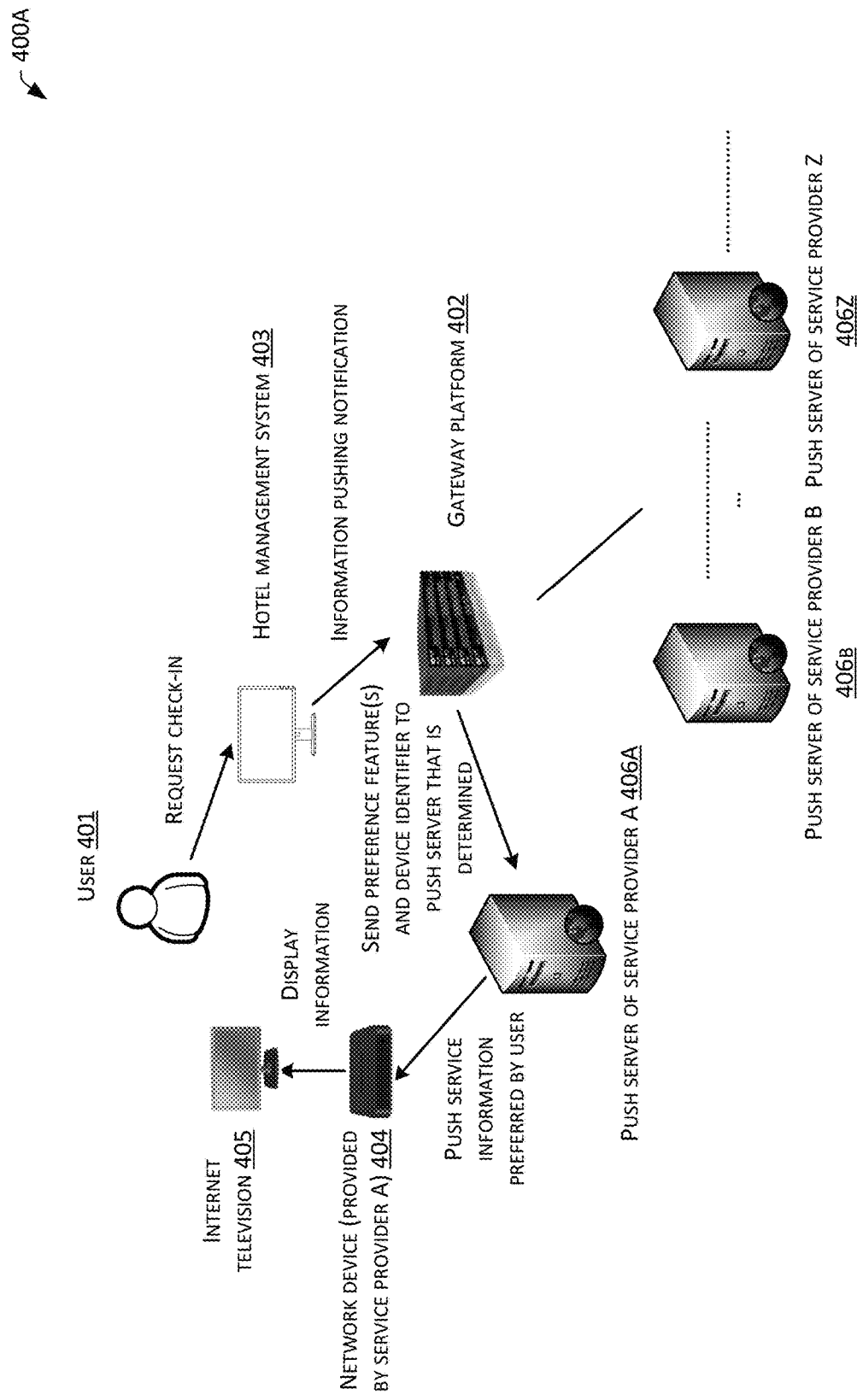
FIG. 4a is a schematic diagram of an information pushing method provided by the embodiments of the present application.

FIG. 4a is a schematic diagram of a method 400A for pushing information according to the embodiments of the present application. As an embodiment provided by the present application, after a user 401 makes a hotel reservation through a gateway platform 402 and comes to an associated hotel for check-in, a hotel management system 403 uploads an electronic certificate presented by the user 401 to the gateway platform 402, performs the check-in for the user 401 (determines a room where the user stays) after receiving a verification notification, and synchronizes a user identifier of the user 401 and a device identifier of a network device 404 in the room where the user stays with the gateway platform. The gateway platform 402 can determine a privilege level of the user 401 and the device identifier of the network device 404 to be used by the user 401 according to the user identifier and the device identifier that are received. The gateway platform 402 further sends a reminder notification to a smart device (mobile phone) of the user 401 to guide the user how to use an Internet television 405 in the room at the same time. The gateway platform 402 may then analyze historical user activity data corresponding to the user identifier, determine a preference feature corresponding to the user identifier, and send the determined preference feature and the privilege level of the user to a corresponding push server 406A (from among push servers provided by different service providers, such as push servers 406A, 406B, . . . 406Z). The push server 406A provides the user with information pushing services according to the preference feature and the privilege level. After the user 401 enters the room and turns on the Internet television 405, the user 401 can see that information displayed by the Internet television 405 is information preferred by the user 401.

Users with different privilege levels can obtain different information. Specifically, mapping relationships between different privilege levels and pieces of information to be pushed can be established. A piece of push information matching a privilege level of a user can be pushed for the user according to the privilege level. In addition, a price mechanism for the user to obtain corresponding piece of push information may be determined according to different privilege levels. Specifically, for a same piece of push information, fees that need to be paid are different for different user levels. A user with a relatively low privilege level needs to pay a higher fee, and a fee needed to be paid by a user with a relatively high privilege level is lower.

For example, if a privilege level of a user is an "ordinary user", the user is required to pay for watching or listening to copyright-restricted movies, music, etc., in information pushed by a push server. For example, if a privilege level of a user is a "platinum member", the user can enjoy discounts when buy products displayed on an Internet television. In summary, the gateway platform can manage a privilege level corresponding to a user identifier of each user, and provide personalized services for the respective user.

Figure 4B:
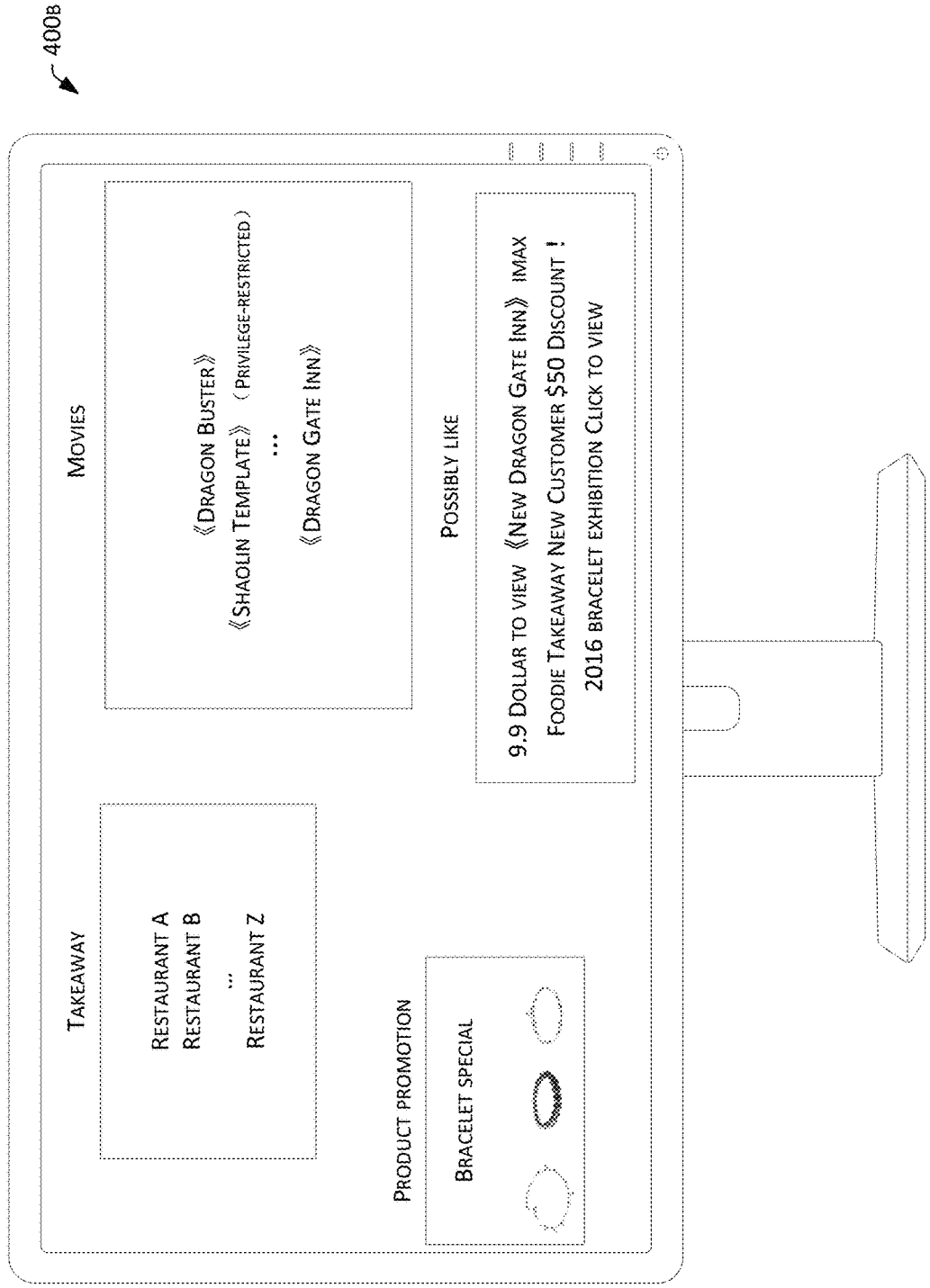
FIG. 4b is a schematic diagram of information displayed by an Internet television provided by the embodiments of the present application.

FIG. 4b is a schematic diagram of information displayed by an Internet television 400B according to the embodiments of the present application. As shown in FIG. 4b, if a user prefers to eat supper, like watching martial arts movies, and like to collect bracelets, information displayed on the Internet television contains information preferred by the user. The user can use a controller of the Internet television or his/her own mobile phone to choose to watch a movie displayed on the screen, choose to purchase a product or a service, etc. When the user selects a product to be purchased, a payment interface may be popped up on the screen or on the user's mobile phone for the user to make a payment. If the user's privilege level is an "ordinary user", the user needs to pay for a certain copyright fee when desiring to watch the movie "Shaolin Temple". If the user's privilege level is a "platinum user", the user can directly choose to watch the movie "Shaolin Temple" because the "platinum user" has already paid a prepaid fee to the gateway platform.

In addition, when the user chooses to purchase audio and video resources, products, and services on the Internet television, the user may use the client provided by the gateway platform to make an associated payment, or may use a payment method such as a bank card payment, a SMS payment, a cash on delivery, etc., which is not limited by the present application.

In addition, when the user uses his/her mobile phone to interact with the Internet television, a control program adapted to the Internet television needs to be pre-installed. The control program can be integrated with the user-version client, or can be downloaded and installed by the user. The present application does not have any limitation thereon.

Figure 5:
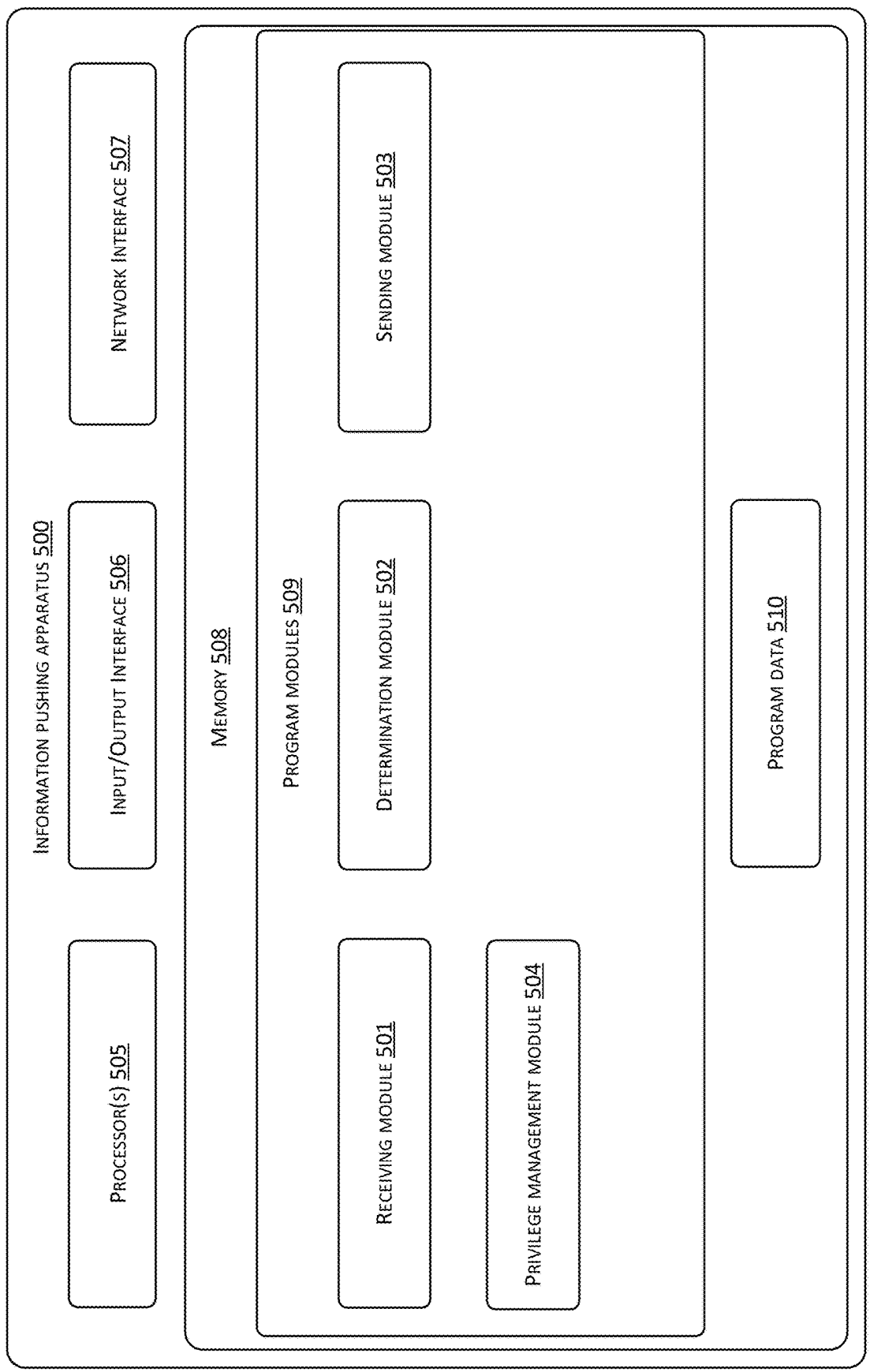
FIG. 5 is a schematic diagram of an information pushing apparatus provided by the embodiments of the present application.

Based on the information pushing method as shown in FIG. 2, the embodiments of the present application further provide an information pushing apparatus 500, as shown in FIG. 5, which includes:
- a receiving module 501 that receives receiving an information push notification sent by a hotel management system, the information push notification being sent by the hotel management system after performing a check-in for a user, and the information push notification including a device identifier of a network device and a user identifier of the user;
- a determination module 502 that determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and
- a sending module 503 that sends preference feature(s) corresponding to the user identifier to the determined push server, to cause the push server to push service information corresponding to the preference feature(s) to the network device corresponding to the device identifier.

The mapping relationships between the device identifiers of the different network devices and the server identifiers of the push servers that push the service information to the network devices are determined by the following manner: receiving and storing a server identifier of a push server of each network device service provider that establishes a cooperative relationship with the gateway platform and a device identifier of each network device; and determining a device identifier of a network device provided by a network device service provider corresponding to a respective server identifier for each server identifier, and establishing a mapping relationship between the respective server identifier and the determined device identifier of the network device.

The sending module 503 encapsulates the preference feature(s) and the device identifier according to a defined gateway control protocol, and sends the encapsulated preference feature(s) and device identifier to the determined push server, so that the determined push server parses the preference feature(s) and the device identifier from the encapsulated preference feature(s) and device identifier, and pushes the service information corresponding to the preference feature(s) to the network device corresponding to the device identifier.

The sending module 503 searches a user activity database for historical user activity data corresponding to the user identifier based on the user identifier, the user activity database including mapping relationships between user identifiers and respective historical user activity data; and determines the preference feature(s) corresponding to the user identifier based on the historical user activity data corresponding to the user identifier; and sends the determined preference feature(s) and the device identifier to the determined push server.

The user activity database is obtained using the following manner, which specifically includes: collecting device execution data and/or user service data sent by respective user identifiers for different user identifiers, using the collected device execution data and/or user service data as respective historical user activity data, and storing the respective user identifiers and the respective historical user activity data into the user activity database.

Determining the preference feature(s) corresponding to the user identifier based on the historical user activity data corresponding to the user identifier specifically includes determining at least one of a picture type, a video type, an audio type, a product type, and a service type preferred by the user corresponding to the user identifier as the preference feature(s) corresponding to the user identifier, based on the historical user activity data corresponding to the user identifier.

The apparatus 500 further includes: a privilege management module 504 that determines a privilege level corresponding to the user identifier based on the user identifier; and sends the determined privilege level to the determined push server, to cause the push server to push the service information corresponding to the preference feature(s) to the network device corresponding to the device identifier according to the privilege level.

In implementations, the apparatus 500 may further include one or more processors 505, an input/output (I/O) interface 506, a network interface 507, and a memory 508.

The memory 508 may include a form of computer readable media such as a volatile memory, a random access memory (RAM) and/or a non-volatile memory, for example, a read-only memory (ROM) or a flash RAM. The memory 508 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 508 may include program modules 509 and program data 510. The program modules 509 may include one or more of the foregoing units as described above and as shown in FIG. 5.

Figure 6:
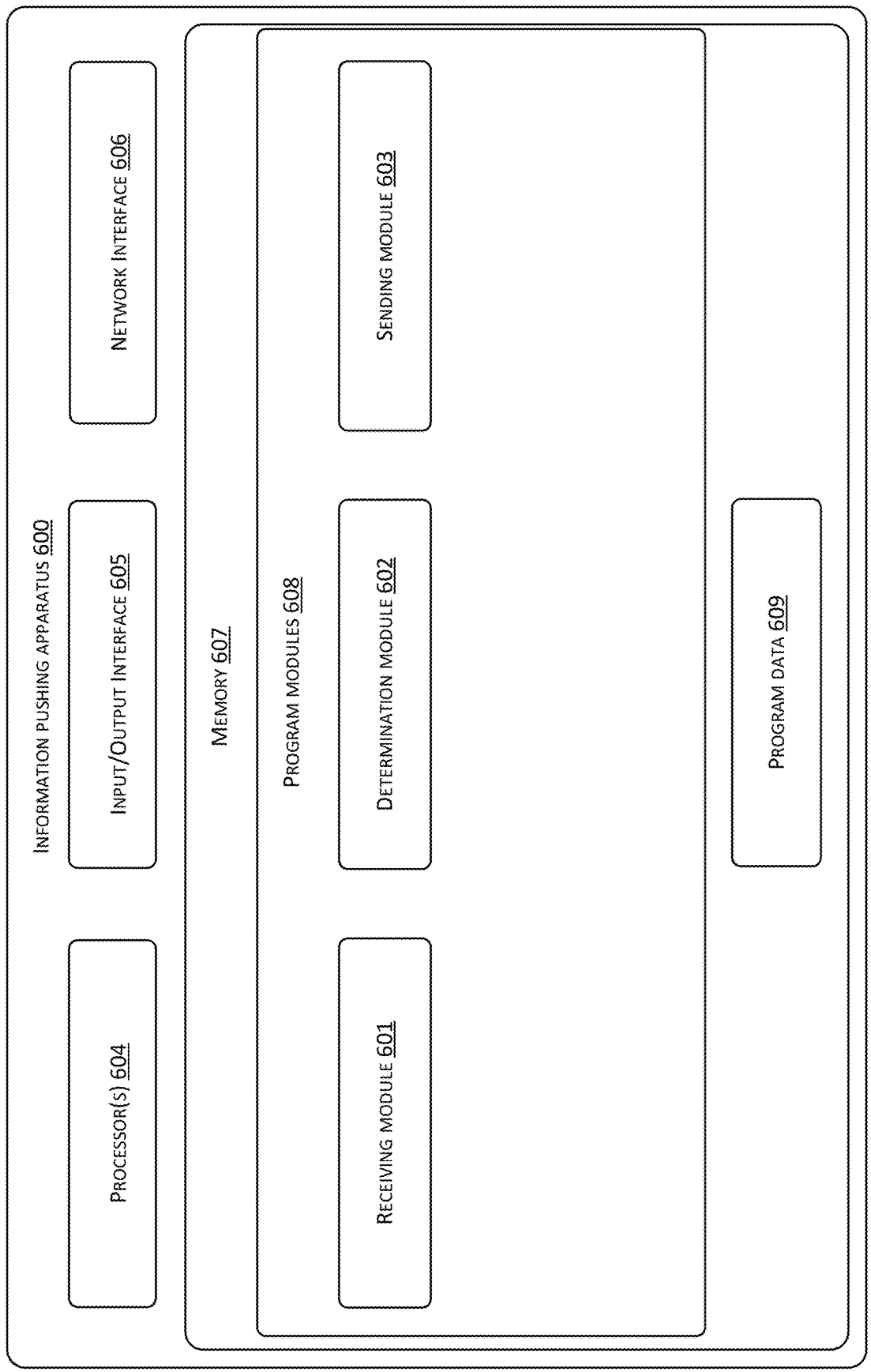
FIG. 6 is a schematic diagram of an information pushing apparatus provided by the embodiments of the present application.

Based on the information pushing method as shown in FIG. 3, the embodiments of the present application further provide an information pushing apparatus 600, as shown in FIG. 6, which includes:

- a receiving module 601 that receives an information push notification sent by a hotel management system, the information push notification being sent by the hotel management system after performing a check-in for a user, and the information push notification including a hotel identifier of a hotel, a device identifier of a network device, and a user identifier of the user;
- a determination module 602 that determines promotion information corresponding to preference feature(s) in a promotion information list according to the preference feature(s) corresponding to the user identifier, and determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and
- a sending module 603 that sends the determined promotion information and the device identifier to the determined push server, to cause the push server to push the promotion information to the network device corresponding to the device identifier.

The promotion information list is determined by: receiving product information sent by the hotel management system, and adding the product information into the promotion information list as the promotion information; and/or determining a hotel address sent by the hotel management system, determining merchant information of merchants in an associated region of the hotel address according to the hotel address, and adding the determined merchant information into the promotion information list as the promotion information.

The determination module 602 determines a product category and/or a merchant category that the user prefers based on the preference feature(s) corresponding to the user identifier; and determines promotion information corresponding to the product category and/or the merchant category in the promotion information list as the promotion information corresponding to the preference feature(s), according to the product category and/or the merchant category.

In implementations, the apparatus 600 may further include one or more processors 604, an input/output (I/O) interface 605, a network interface 606, and a memory 607. The memory 607 may include a form of computer readable media as described in the foregoing description.

In implementations, the memory 607 may include program modules 608 and program data 609. The program modules 608 may include one or more of the foregoing units as described above and as shown in FIG. 6.

In the 1990s, a technical improvement may be clearly differentiated by hardware improvements (for example, improvements in circuit structures such as diodes, transistors, switches, etc.) or software improvements (improvements in method processes). However, with the development of technologies, many of today's method process improvements can be seen as a direct improvement in hardware circuit architectures. Designers may incorporate improved methods to hardware circuits to get the corresponding hardware circuit structures. Accordingly, a method of process improvement may be achieved with hardware entity modules. For example, a programmable logic device (Programmable Logic Device, PLD) (e.g., Field Programmable Gate Array, FPGA) is one such integrated circuit whose logic functions are determined through programming the device by a user. With a designer to program a digital system for "integrating" into a PLD on his/her own, it is not necessary to have a chip manufacturer to design and manufacture a dedicated integrated circuit chip. Further, by replacing manually produced integrated circuit chips, this type of programming is also mostly replaced by "logic compiler" software. Similar to a software compiler, such logic compiler compiles original codes written by a specific programming language, which is called a hardware description language (Hardware Description Language, HDL). HDL does not include only one type, and there are many kinds, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most common ones are VHDL (Very-High-Speed Integrated Circuit Hardware Description Language) and Verilog. One skilled in the art should understand that a hardware circuit implementing the logic method flow may be easily achieved by performing a little logic programming and compiling these methods into an integrated circuit using hardware description language.

A controller can be implemented in any suitable manner. For example, a controller can take a form of, for example, a microprocessor or processor, and computer readable media, logic gates, switches, application specific integrated circuits (ASICs), programmable logic controllers, and embedded microcontrollers, that store computer readable program codes (e.g., software or firmware) executable by the microprocessor or processor. Examples of a controller include, but are not limited to, the following microcontrollers: ARC 625D, Atmel AT91SAM, The Microchip PIC18F26K20 and Silicone Labs C8051F320. A memory controller can also be implemented as a part of control logic of a memory. In addition to implementing a controller in a form of purely computer readable program codes, one skilled in the art should also understand that the method operations can be logically programmed to cause a controller in a form of logic gates, switches, ASICs, programmable logic controllers, and embedded microcontrollers, etc., to implement the same functions. Such type of controller can therefore be considered as a hardware component, and an apparatus used for implementing various functions included therein can also be considered as a structure within the hardware component. Or even an apparatus used for implementing various functions can be considered as both software module(s) implementing a method and a structure within a hardware component.

The systems, apparatuses, modules or units illustrated in the above embodiments may be implemented by a computer chip or an entity, or by a product having certain functions. A device of a typical implementation is a computer, and a specific form of the computer may be a personal computer, a laptop computer, a cellular phone, a camera phone, a smart phone, a personal digital assistant, a media player, a navigation device, an email transceiver, and a game control, a tablet computer, a wearable device, or any combination of a number of these devices.

For the convenience of description, the above apparatuses are divided into various units in terms of functionalities respectively during description. Apparently, function(s) of each unit may be implemented in the same piece of software or multiple pieces of software and/or hardware when the present application is implemented.

One skilled in the art should understand that the embodiments of the present invention can be provided as a method, a system, or a computer program product. Accordingly, the present invention may take a form of an entirely hardware embodiment, an entirely software embodiment, or a combination of software and hardware. Moreover, the invention can take a form of a computer program product embodied on one or more computer-usable storage media (including but not limited to a magnetic disk storage device, a CD-ROM, an optical storage device, etc.) that include computer usable program codes.

The present invention has been described with reference to flowcharts and/or block diagrams of methods, apparatus (system), and computer program products with reference to and according to the embodiments of the present invention. It should be understood that each process and/or block of the flowcharts and/or block diagrams, and combinations of processes and/or blocks of the flowcharts and/or block diagrams are implemented by computer program instructions. These computer program instructions can be provided to a general purpose computer, a special purpose computer, an embedded processor, or other programmable data processing device to produce a machine, to cause an execution of the instructions by a processor of a computer or other programmable data processing device to produce an apparatus used for implementing functions specified in one or more processes in the flowcharts and/or one or more blocks of the block diagrams.

These computer program instructions can also be stored in a computer readable storage device that can direct a computer or other programmable data processing device to operate in a specific way, such that the instructions stored in the computer readable storage device produce an article of manufacture including an instruction apparatus. The instruction apparatus implements functions specified in one or more processes in the flowcharts and/or one or more blocks of the block diagrams.

These computer program instructions can also be loaded onto a computer or other programmable data processing device, such that a series of operational operations are performed on a computer or other programmable device to produce computer-implemented processing, thereby the instructions that are executed on a computer or other programmable device provide operations for implementing functions one or more processes in the flowcharts and/or one or more blocks of the block diagrams.

In a typical configuration, a computing device includes one or more processors (CPUs), an input/output interface, a network interface, and memory.

It also needs to be understood that terms "including", "containing" or any other variations are intended to encompass a non-exclusive inclusion, such that a process, method, product, or device including a series of elements includes not only these elements, but also other elements that are not explicitly listed, or elements that are inherent to such process, method, product, or device. With any further limitation, an element defined by a phrase "comprising a . . . " does not exclude the presence of additional equivalent elements in the process, method, product, or device including such element.

One skilled in the art should understand that the embodiments of the present invention can be provided as a method, a system, or a computer program product. Accordingly, the present invention may take a form of an entirely hardware embodiment, an entirely software embodiment, or a combination of software and hardware. Moreover, the invention can take a form of a computer program product embodied on one or more computer-usable storage media (including but not limited to a magnetic disk storage device, a CD-ROM, an optical storage device, etc.) that include computer usable program codes.

The present application can be described in the general context of computer-executable instructions executed by a computer, such as a program module. Generally, program modules include routines, programs, objects, components, data structures, etc., that perform particular tasks or implement particular abstract data types. The present application can also be practiced in distributed computing environments. In these distributed computing environments, tasks are performed by remote processing devices that are connected through a communication network. In a distributed computing environment, program modules can be located in both local and remote computer storage media including storage devices.

Various embodiments in the present specification are described in a progressive manner. Same or similar parts between the various embodiments may be referenced to each other. Each embodiment puts an emphasis on an aspect that is different from those of other embodiments. In particular, due to their basic similarities to the method embodiments, the description of system embodiments is relatively simple. Relevant parts can be referred to the description of the method embodiments.

The foregoing describes the embodiments of the present application only, and is not intended to limit the present application. Various changes and modifications can be made to the present application by one skilled in the art. Any modifications, equivalents, improvements, etc., that are made within the spirit and scope of the present application are intended to be included within the scope of the claims of the present application.

The present disclosure can be further understood using the following clauses.

Clause 1: An information pushing method, which is applied to a gateway platform, the method comprising: receiving an information push notification sent by a hotel management system, the information push notification being sent by the hotel management system after performing a check-in for a user, and the information push notification including a device identifier of a network device and a user identifier of the user; determining a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and sending a preference feature corresponding to the user identifier to the determined push server, to cause the push server to push service information corresponding to the preference feature to the network device corresponding to the device identifier.

Clause 2: The method according to Clause 1, wherein the mapping relationships between the device identifiers of the different network devices and the server identifiers of the push servers that push the service information to the network devices are determined by the following manner: receiving and storing a server identifier of a push server of each network device service provider that establishes a cooperative relationship with the gateway platform and a device identifier of each network device; and determining a device identifier of a network device provided by a network device service provider corresponding to a respective server identifier for each server identifier, and establishing a mapping relationship between the respective server identifier and the determined device identifier of the network device.

Clause 3: The method according to Clause 1 or 2, wherein sending the preference feature corresponding to the user identifier and the device identifier to the determined push server comprises: encapsulating the preference feature and the device identifier according to a defined gateway control protocol, and sending the encapsulated preference feature and device identifier to the determined push server, so that the determined push server parses the preference feature and the device identifier from the encapsulated preference feature and device identifier, and pushes the service information corresponding to the preference feature to the network device corresponding to the device identifier.

Clause 4: The method according to Clause 1 or 2, wherein sending the preference feature corresponding to the user identifier and the device identifier to the determined push server comprises: searching a user activity database for historical user activity data corresponding to the user identifier based on the user identifier, the user activity database including mapping relationships between user identifiers and respective historical user activity data; determining the preference feature corresponding to the user identifier based on the historical user activity data corresponding to the user identifier; and sending the determined preference feature and the device identifier to the determined push server.

Clause 5: The method according to Clause 4, wherein the user activity database is obtained by: collecting device execution data and/or user service data sent by respective user identifiers for different user identifiers, using the collected device execution data and/or user service data as respective historical user activity data, and storing the respective user identifiers and the respective historical user activity data into the user activity database.

Clause 6: The method according to Clause 4, wherein the historical user activity data corresponding to the user identifier comprises: determining at least one of a picture type, a video type, an audio type, a product type, and a service type preferred by the user corresponding to the user identifier as the preference feature corresponding to the user identifier, based on the historical user activity data corresponding to the user identifier.

Clause 7: The method according to Clause 1, wherein the method further comprises: determining a privilege level corresponding to the user identifier based on the user identifier; and sending the determined privilege level to the determined push server, to cause the push server to push the service information corresponding to the preference feature to the network device corresponding to the device identifier according to the privilege level.

Clause 8: An information pushing method, which is applied to a gateway platform, the method comprising: receiving an information push notification sent by a hotel management system, the information push notification being sent by the hotel management system after performing a check-in for a user, and the information push notification including a hotel identifier of a hotel, a device identifier of a network device, and a user identifier of the user; determining promotion information corresponding to the preference feature in a promotion information list according to preference feature corresponding to the user identifier, and determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and sending the determined promotion information and the device identifier to the determined push server, to cause the push server to push the promotion information to the network device corresponding to the device identifier.

Clause 9: The method according to Clause 8, wherein the promotion information list is determined by: receiving product information sent by the hotel management system, and adding the product information into the promotion information list as the promotion information; and/or determining a hotel address sent by the hotel management system, determining merchant information of merchants in an associated region of the hotel address according to the hotel address, and adding the determined merchant information into the promotion information list as the promotion information.

Clause 10: The method according to Clause 9, wherein determining the promotion information corresponding to the preference feature in the promotion information list according to preference feature corresponding to the user identifier specifically comprises: determining a product category and/or a merchant category that the user prefers based on the preference feature corresponding to the user identifier; and determining promotion information corresponding to the product category and/or the merchant category in the promotion information list as the promotion information corresponding to the preference feature, according to the product category and/or the merchant category.

Clause 11: An information pushing apparatus comprising: a receiving module that receives receiving an information push notification sent by a hotel management system, the information push notification being sent by the hotel management system after performing a check-in for a user, and the information push notification including a device identifier of a network device and a user identifier of the user; a determination module that determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and a sending module that sends a preference feature corresponding to the user identifier to the determined push server, to cause the push server to push service information corresponding to the preference feature to the network device corresponding to the device identifier.

Clause 12: The apparatus according to Clause 11, wherein the mapping relationships between the device identifiers of the different network devices and the server identifiers of the push servers that push the service information to the network devices are determined by the following manner: receiving and storing a server identifier of a push server of each network device service provider that establishes a cooperative relationship with the gateway platform and a device identifier of each network device; and determining a device identifier of a network device provided by a network device service provider corresponding to a respective server identifier for each server identifier, and establishing a mapping relationship between the respective server identifier and the determined device identifier of the network device.

Clause 13: The apparatus according to Clause 11 or 12, wherein the sending module encapsulates the preference feature and the device identifier according to a defined gateway control protocol, and sends the encapsulated preference feature and device identifier to the determined push server, so that the determined push server parses the preference feature and the device identifier from the encapsulated preference feature and device identifier, and pushes the service information corresponding to the preference feature to the network device corresponding to the device identifier.

Clause 14: The apparatus according to Clause 11 or 12, wherein the sending module searches a user activity database for historical user activity data corresponding to the user identifier based on the user identifier, the user activity database including mapping relationships between user identifiers and respective historical user activity data; and determines the preference feature corresponding to the user identifier based on the historical user activity data corresponding to the user identifier; and sends the determined preference feature and the device identifier to the determined push server.

Clause 15: The apparatus according to Clause 14, wherein the user activity database is obtained using the following manner, which specifically comprises: collecting device execution data and/or user service data sent by respective user identifiers for different user identifiers, using the collected device execution data and/or user service data as respective historical user activity data, and storing the respective user identifiers and the respective historical user activity data into the user activity database.

Clause 16: The apparatus according to Clause 14, wherein determining the preference feature corresponding to the user identifier based on the historical user activity data corresponding to the user identifier specifically comprises: determining at least one of a picture type, a video type, an audio type, a product type, and a service type preferred by the user corresponding to the user identifier as the preference feature (s) corresponding to the user identifier, based on the historical user activity data corresponding to the user identifier.

Clause 17: The apparatus according to Clause 11, wherein the apparatus further comprises: a privilege management module that determines a privilege level corresponding to the user identifier based on the user identifier; and sends the determined privilege level to the determined push server, to cause the push server to push the service information corresponding to the preference feature to the network device corresponding to the device identifier according to the privilege level.

Clause 18: An information push apparatus comprising: a receiving module that receives an information push notification sent by a hotel management system, the information push notification being sent by the hotel management system after performing a check-in for a user, and the information push notification including a hotel identifier of a hotel, a device identifier of a network device, and a user identifier of the user; a determination module that determines promotion information corresponding to a preference feature in a promotion information list according to the preference feature corresponding to the user identifier, and determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and a sending module that sends the determined promotion information and the device identifier to the determined push server, to cause the push server to push the promotion information to the network device corresponding to the device identifier.

Clause 19: The apparatus according to Clause 18, wherein the promotion information list is determined by: receiving product information sent by the hotel management system, and adding the product information into the promotion information list as the promotion information; and/or determining a hotel address sent by the hotel management system, determining merchant information of merchants in an associated region of the hotel address according to the hotel address, and adding the determined merchant information into the promotion information list as the promotion information.

Clause 20: The apparatus according to Clause 19, wherein the determination module determines a product category and/or a merchant category that the user prefers based on the preference feature corresponding to the user identifier; and determines promotion information corresponding to the product category and/or the merchant category in the promotion information list as the promotion information corresponding to the preference feature, according to the product category and/or the merchant category.

What is claimed is:

1. A method implemented by a gateway platform, the method comprising:
    receiving an electronic certificate from a hotel management system, the electronic certificate being obtained by a user after a hotel reservation is made on the gateway platform;
    returning a verification notification to the hotel management system to enable a check-in for the user upon successful verification of the electronic certificate;
    receiving an information push notification sent by the hotel management system, the information push notification comprising a device identifier of a network device and a user identifier of the user;
    determining a push server corresponding to the device identifier from among a plurality of push servers that establish a cooperative relationship with the gateway platform according to the device identifier; and
    sending a preference feature corresponding to the user identifier to the determined push server, to cause the push server to push service information corresponding to the preference feature to the network device corresponding to the device identifier.

2. The method according to claim 1, further comprising: storing respective mapping relationships between device identifiers of different network devices and server identifiers of push servers that push service information to the network devices prior to receiving the information push notification sent by the hotel management system.

3. The method according to claim 2, further comprising determining the mapping relationships between the device identifiers of the different network devices and the server identifiers of the push servers that push the service information to the network devices.

4. The method according to claim 3, wherein determining mapping relationships comprises:
receiving and storing a server identifier of a push server of each network device service provider that establishes a cooperative relationship with the gateway platform and a device identifier of each network device; and
determining a device identifier of a network device provided by a network device service provider corresponding to a respective server identifier for each server identifier, and establishing a mapping relationship between the respective server identifier and the determined device identifier of the network device.

5. The method according to claim 1, wherein sending the preference feature corresponding to the user identifier and the device identifier to the determined push server comprises:
encapsulating the preference feature and the device identifier according to a defined gateway control protocol, and sending the encapsulated preference feature and device identifier to the determined push server, so that the determined push server parses the preference feature and the device identifier from the encapsulated preference feature and device identifier, and pushes the service information corresponding to the preference feature to the network device corresponding to the device identifier.

6. The method according to claim 1, wherein sending the preference feature corresponding to the user identifier and the device identifier to the determined push server comprises:
searching a user activity database for historical user activity data corresponding to the user identifier based on the user identifier, the user activity database including mapping relationships between user identifiers and respective historical user activity data;
determining the preference feature corresponding to the user identifier based on the historical user activity data corresponding to the user identifier; and
sending the determined preference feature and the device identifier to the determined push server.

7. The method according to claim 6, wherein the user activity database is obtained by:
collecting device execution data and/or user service data sent by respective user identifiers for different user identifiers, using the collected device execution data and/or user service data as respective historical user activity data, and storing the respective user identifiers and the respective historical user activity data into the user activity database.

8. The method according to claim 6, wherein the historical user activity data corresponding to the user identifier comprises:
determining at least one of a picture type, a video type, an audio type, a product type, and a service type preferred by the user corresponding to the user identifier as the preference feature corresponding to the user identifier, based on the historical user activity data corresponding to the user identifier.

9. The method according to claim 1, further comprising:
determining a privilege level corresponding to the user identifier based on the user identifier; and
sending the determined privilege level to the determined push server, to cause the push server to push the service information corresponding to the preference feature to the network device corresponding to the device identifier according to the privilege level.

10. The method according to claim 1, wherein the information push notification is received from the hotel management system after the hotel management system performs a check-in for the user.

11. One or more computer readable media storing executable instructions that, when executed by one or more processors of a gateway platform, cause the one or more processors to perform acts comprising:
receiving an electronic certificate from a hotel management system, the electronic certificate being obtained by a user after a hotel reservation is made on the gateway platform;
returning a verification notification to the hotel management system to enable a check-in for the user upon successful verification of the electronic certificate;
receiving an information push notification sent by the hotel management system, the information push notification being sent by the hotel management system after performing the check-in for the user, and the information push notification including a hotel identifier of a hotel, a device identifier of a network device, and a user identifier of the user;
determining promotion information corresponding to the preference feature in a promotion information list according to preference feature corresponding to the user identifier, and determines a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and
sending the determined promotion information and the device identifier to the determined push server, to cause the push server to push the promotion information to the network device corresponding to the device identifier.

12. The one or more computer readable media according to claim 11, wherein the promotion information list is determined by:
receiving product information sent by the hotel management system, and adding the product information into the promotion information list as the promotion information; and/or
determining a hotel address sent by the hotel management system, determining merchant information of merchants in an associated region of the hotel address according to the hotel address, and adding the determined merchant information into the promotion information list as the promotion information.

13. The one or more computer readable media according to claim 12, wherein determining the promotion information corresponding to the preference feature in the promotion information list according to preference feature corresponding to the user identifier comprises:
  determining a product category and/or a merchant category that the user prefers based on the preference feature corresponding to the user identifier; and
  determining promotion information corresponding to the product category and/or the merchant category in the promotion information list as the promotion information corresponding to the preference feature, according to the product category and/or the merchant category.

14. An apparatus comprising:
one or more processors;
memory;
a receiving module stored in the memory and executable by the one or more processors to receive an electronic certificate from a hotel management system, and receive an information push notification sent by a hotel management system, the electronic certificate being obtained by a user after a hotel reservation is made on a gateway platform, the information push notification being sent by the hotel management system after performing a check-in for the user, and the information push notification including a device identifier of a network device and a user identifier of the user;
a determination module stored in the memory and executable by the one or more processors to determine a push server corresponding to the device identifier from among a plurality of push servers that establish a cooperative relationship with the gateway platform according to the device identifier, the gateway platform storing respective mapping relationships between device identifiers of different network devices and server identifiers of push servers that push service information to the network devices; and
a sending module stored in the memory and executable by the one or more processors to return a verification notification to the hotel management system to enable the check-in for the user upon successful verification of the electronic certificate, and send a preference feature corresponding to the user identifier to the determined push server, to cause the push server to push service information corresponding to the preference feature to the network device corresponding to the device identifier.

15. The apparatus according to claim 14, wherein the mapping relationships between the device identifiers of the different network devices and the server identifiers of the push servers that push the service information to the network devices are determined by:
  receiving and storing a server identifier of a push server of each network device service provider that establishes a cooperative relationship with the gateway platform and a device identifier of each network device; and
  determining a device identifier of a network device provided by a network device service provider corresponding to a respective server identifier for each server identifier, and establishing a mapping relationship between the respective server identifier and the determined device identifier of the network device.

16. The apparatus according to claim 14, wherein the sending module encapsulates the preference feature and the device identifier according to a defined gateway control protocol, and sends the encapsulated preference feature and device identifier to the determined push server, so that the determined push server parses the preference feature and the device identifier from the encapsulated preference feature and device identifier, and pushes the service information corresponding to the preference feature to the network device corresponding to the device identifier.

17. The apparatus according to claim 14, wherein the sending module searches a user activity database for historical user activity data corresponding to the user identifier based on the user identifier, the user activity database including mapping relationships between user identifiers and respective historical user activity data; and determines the preference feature corresponding to the user identifier based on the historical user activity data corresponding to the user identifier; and sends the determined preference feature and the device identifier to the determined push server.

18. The apparatus according to claim 17, wherein the user activity database is obtained by:
  collecting device execution data and/or user service data sent by respective user identifiers for different user identifiers, using the collected device execution data and/or user service data as respective historical user activity data, and storing the respective user identifiers and the respective historical user activity data into the user activity database.

19. The apparatus according to claim 17, wherein determining the preference feature corresponding to the user identifier based on the historical user activity data corresponding to the user identifier comprises:
  determining at least one of a picture type, a video type, an audio type, a product type, and a service type preferred by the user corresponding to the user identifier as the preference feature(s) corresponding to the user identifier, based on the historical user activity data corresponding to the user identifier.

20. The apparatus according to claim 14, further comprising:
  a privilege management module stored in the memory and executable by the one or more processors to determine a privilege level corresponding to the user identifier based on the user identifier; and send the determined privilege level to the determined push server, to cause the push server to push the service information corresponding to the preference feature to the network device corresponding to the device identifier according to the privilege level.

* * * * *